June 13, 1961
J. E. BANCROFT
2,988,675
SOLENOID-ACTUATED DEVICE
Filed March 28, 1958
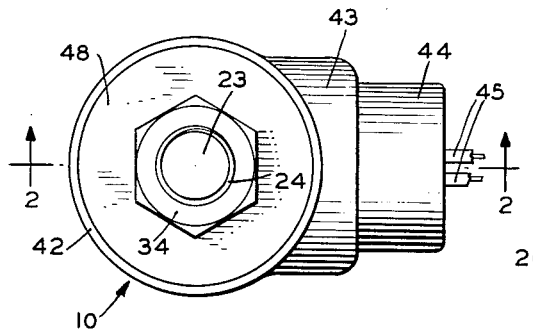
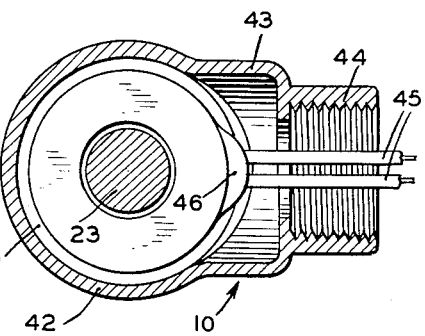
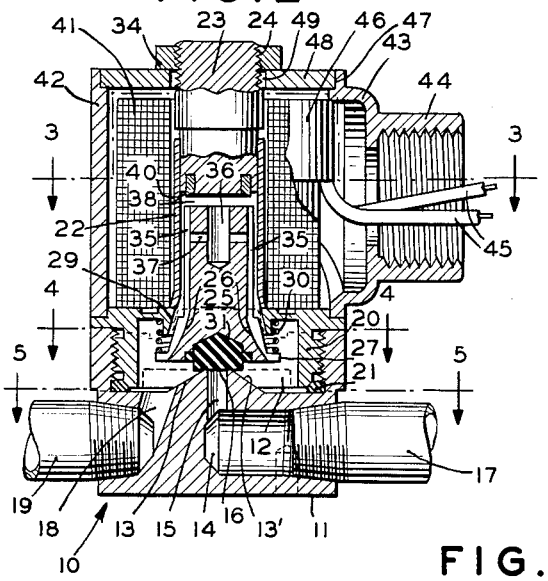
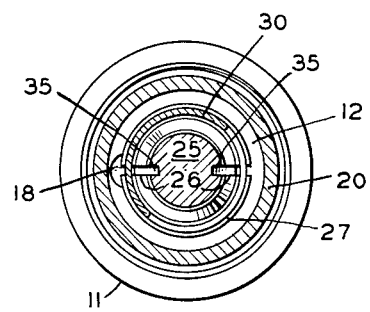
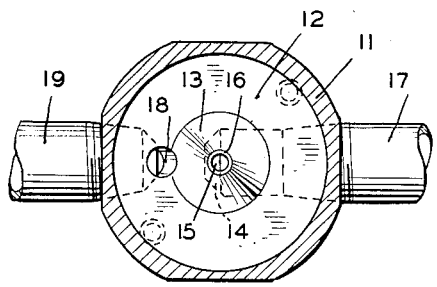
INVENTOR.
JAMES E. BANCROFT
BY *F. J. Pisarra*
ATTORNEY

United States Patent Office 2,988,675
Patented June 13, 1961

2,988,675
SOLENOID-ACTUATED DEVICE
James E. Bancroft, Bayside, N.Y., assignor to Allied Control Company, Inc., New York, N.Y., a corporation of New York
Filed Mar. 28, 1958, Ser. No. 724,690
3 Claims. (Cl. 317—191)

This invention relates to the art of magnetically operable devices, and, in one of its more specific aspects to a solenoid-actuated fluid valve which is fast acting and which provides for smoother control of fluid flow.

Solenoid type valves are frequently used for the purpose of controlling flow of fluid from one location to another. They are usually provided with inlet and outlet conduits and the flow of fluid therebetween is controlled by the operation of a solenoidally actuated magnetic metal plunger mechanism which normally blocks, or causes to be blocked, the flow of the fluid. The air-gap between the magnetic plunger and the external portion of the valve, before the pull-in position of the plunger, is usually large because of the nature of the construction of the plunger and the bore through which the plunger operates. Such large air-gaps require relatively large magnetomotive forces to urge the plunger into its actuated position, thus requiring a correspondingly great lapse of time for the plunger to operate and reach its full pull-in position.

Another objection to present day solenoid-actuated valves is the size and configuration of the housing or casing within which the electromagnet coil is placed. Generally, such housings are purposely made oversize to permit of ready insertion and accommodation of the magnet coil, especially that portion of the coil from which the external leads emanate, since such portion presents a bulky protruding impediment. Because of the oversize housing, to allow for the reception and accommodation of the protruding portion of the coil, a considerable amount of space is wasted in the housing. The housing of my valve eliminates waste space and is more compact than conventional housings. Moreover, it is so configured as to permit of ready insertion or removal of the magnet coil, as required.

It is therefore an object of this invention to provide an improved solenoid-actuated device which has more rapid response and requires less magnetomotive force to actuate it.

Another object of this invention is to provide a solenoid-actuated valve for controlling the flow of fluid in a smoother manner.

A further object of this invention is to provide a valve of the character indicated that is simple and compact in design, that is durable in construction, that may be readily assembled or dismantled, that is reasonable in manufacturing cost, that is efficient in operation, and that is capable of performing its intended functions in a trouble-free manner.

Other objects, novel features and advantages of this invention will become apparent from the following detailed description taken in conjunction with the accompanying drawing, wherein:

FIG. 1 is a top plan view of a solenoid-actuated valve according to the invention;

FIG. 2 is a view, taken along line 2—2 of FIG. 1, additionally illustrating parts of inlet and outlet conduits;

FIG. 3 is a view taken along staggered line 3—3 of FIG. 2;

FIG. 4 is a view taken along staggered line 4—4 of FIG. 2; and

FIG. 5 is a view taken along staggered line 5—5 of FIG. 2.

Referring now to the drawing and more particularly to FIG. 2, there is illustrated an assembled solenoid-actuated valve 10 having a generally cylindrical metal base 11, preferably of steeel or the like. Base 11 has a recess 12 formed therein and is provided with an annular, conically shaped, valve seat 13 at the central portion of the recess. An inlet port 14 in the base communicates, by way of a passage 15 in the annular valve seat, with the recess portion of the base. The valve seat 13, according to the invention, has a relatively flat frusto-conical surface 13' to prevent sharp transitions in the flow of fluid at the orifice 16, thus allowing for smoother flow of fluid. Furthermore, the greater surface area presented about the orifice reduces the amount of machining required to produce the valve seat, thereby reducing time and cost in making the valve.

A first conduit 17 is threadedly connected to base 11 and establishes communication between a source of fluid supply (not shown) and inlet port 14. The base also has an outlet port 18. A second conduit 19 is threadedly connected to the base and communicates with the outlet port. This conduit is adapted to transmit fluid supplied by conduit 17, as allowed by the valve, to a selected location (not shown).

A magnetic metal bushing 20 is threadedly mounted to the base 11 in the recess portion thereof and bears against a resilient rubber-like gasket 21 in sealing engagement therewith. A nonmagnetic sleeve 22 is secured to the bushing 20 and is coaxial therewith. Sleeve 22 is closed at its upper end by a plug 23 of a magnetic metal, the outer end of which is threaded at 24 and is held firmly by a nut 34. Within the sleeve 22 there is disposed a plunger 25 of a magnetic material for movement toward and away from the valve seat 13. The plunger 25 has, at its lower end, a tapered portion 26 which terminates in an outwardly extending annular flange 27. The bushing 20 has a tapered annular portion 29 corresponding to the tapered portion of the plunger and adapted to receive the plunger in its upward movement. The space defined by the two tapered portions 26 and 29 constitutes an air-gap between the plunger and the bushing. The sloping air-gap formed by the bushing and plunger tapered portion presents a smaller air-gap displacement for a given vertical movement of the plunger than is presented by other types of commercially available solenoid valves, thus reducing the magnetomotive force necessary to urge the plunger in its upward movement. A helical compression spring 30 is disposed about the plunger between the flange 27 and the bushing 20. This spring normally and yieldingly biases the plunger toward the valve seat 13. The lower end of the plunger 25 is recessed to receive a valve plug 31, which is made of suitable flexible resilient material, such as rubber or the like, for engagement with the valve seat 13.

The plunger 25 has a pair of diametrically opposed longitudinal slots 35. Each of these slots extends the full length of the plunger and communicates with a bore 36 in the plunger upper end portion through a cross port 37 which is transverse of the plunger axis. The illustrated arrangement of slots 35, bore 36 and cross port 37 provides an air passage to allow for the intake and exhaust of air to and from the space 38 defined by the upper part of the plunger and a shading ring 40 in plug 23, thereby preventing the plunger in its operation from clogging, sticking or being otherwise impeded in its upward and downward travel.

Coaxial with and surrounding sleeve 22 and plug 23 is an electromagnet coil 41 which rests on bushing 20. Coil 41 is positioned wholly within a metal housing 42. The housing has an integral hollow lateral extension 43 which terminates in an internally threaded tubular connector 44 of reduced diameter. The electromagnet coil is provided with a pair of electric leads 45 which extend through extension 43 and connector 44. The juncture of leads 45 and coil proper forms a protrusion 46. As shown, housing 42 and its extension 43 are so configured and arranged as to permit ready insertion of the coil in the housing and accommodation of protrusion 46 and portions of leads 45 in the extension.

The lower end of housing 42 bears against bushing 20. The upper end of the housing is provided with an annular groove 47 to receive a cover plate 48 which has central opening 49. Plug 23, as best shown in FIG. 2, extends through opening 49. Nut 34 engages the threaded end 24 of the plug, as earlier described, and maintains housing 42, cover plate 48 and associated parts in assembled relation.

The magnetic circuit formed by the above described devices comprises housing 42, cover 48, plug 23, bushing 20 and the air-gap defined by the tapered portions 26 and 29 of the plunger and the bushing, respectively.

For the purpose of briefly describing the operation of the illustrated embodiment of the invention, it is first assumed that valve 10 has been assembled and that electric leads 45 are connected to a suitable source of electric energy (not shown). It is also assumed that conduit 17 is connected to a source of fluid supply (not shown). With coil 41 deenergized, plunger 25 is maintained in its lowermost position by compression spring 30 so that valve plug 31 bears against valve seat 13 and closes orifice 16, as shown in FIG. 2. When the parts are in this relative position, there is no fluid flow from inlet conduit 17 to discharge conduit 19.

Upon energization of coil 41, plunger 25 and valve plug 31 are moved upwardly against the action of spring 30. This releases the valve plug from the valve seat and permits fluid, supplied by conduit 17, to flow through passage 15, orifice 16, recess 12, outlet 18 and thence into discharge conduit 19. When the coil is again deenergized, spring 30 moves the plunger and valve plug downwardly to the illustrated position, thereby pressing the valve plug against the valve seat and terminating fluid flow through the valve.

From the foregoing, it is believed that the construction, operation and advantages of this invention will be apparent to those skilled in the art without further description. It is to be clearly understood, however, that various changes in size, shape, proportion and minor details of construction may be resorted to without departing from the spirit, or sacrificing any of the advantages of the invention.

I claim:

1. In a solenoid-actuated device, a housing, a member comprising a magnetic material within the housing, said member having a vertical through opening, at least the lower portion of the surface of the member which defines said opening being flared outwardly and downwardly, a plunger comprising a magnetic material extending through and reciprocable in said opening, the outer surface of the lower end of the plunger being flared outwardly and downwardly, means within the housing limiting movement of the plunger relative to the member in opposite directions, said means being independent of the member, and resilient means for normally and yieldingly urging the plunger in one direction relative to the member, and a magnet coil disposed around the plunger and adapted, upon energization, to move the plunger in a reverse direction against the action of the resilient means, said flared surfaces of the member and plunger being spaced and defining a gap at all times and being so configured and arranged that lines of magnetic force extend therebetween regardless of the position of the plunger relative to the member when the coil is energized.

2. In a solenoid-actuated device, a housing, a member comprising a magnetic material within the housing, said member having a vertical through opening, at least the lower portion of the surface of the member which defines said opening being flared outwardly and downwardly, a plunger comprising a magnetic material extending through and reciprocable in said opening, the outer surface of the lower end of the plunger being flared outwardly and downwardly, means within the housing limiting movement of the plunger relative to the member in opposite directions, said means being independent of the member, and resilient means for normally and yieldingly urging the plunger downwardly relative to the member, and a magnet coil disposed around the plunger and adapted, upon energization, to move the plunger upwardly relative to the member against the action of the resilient means, said flared surfaces of the member and plunger being spaced and defining a gap at all times and being so configured and arranged that lines of magnetic force extend therebetween regardless of the position of the plunger relative to the member when the coil is energized.

3. A device according to claim 2 wherein the housing includes an upstanding cylindrical wall and a tubular wall connected to and extending laterally of the cylindrical wall, and wherein the magnet coil is provided with a pair of electric leads which extend through the tubular wall, the juncture of the coil and the electric leads forming a protrusion that is positioned at least partly within the tubular wall.

References Cited in the file of this patent

UNITED STATES PATENTS

| | | |
|---|---|---|
| 631,162 | Guyenot | Aug. 15, 1899 |
| 1,601,014 | Wismer | Sept. 28, 1926 |
| 2,181,423 | Gille | Nov. 28, 1939 |
| 2,238,401 | Shaw | Apr. 15, 1941 |
| 2,614,584 | Geopfrich | Oct. 21, 1952 |
| 2,616,449 | Maha | Nov. 4, 1952 |
| 2,624,585 | Churchill | Jan. 6, 1953 |

FOREIGN PATENTS

| | | |
|---|---|---|
| 494,316 | Canada | July 7, 1953 |
| 1,070,958 | France | Feb. 24, 1954 |
| 739,076 | Great Britain | Oct. 26, 1955 |